(12) United States Patent
Bacher et al.

(10) Patent No.: US 9,201,678 B2
(45) Date of Patent: Dec. 1, 2015

(54) PLACING A VIRTUAL MACHINE ON A TARGET HYPERVISOR

(75) Inventors: Utz Bacher, Boeblingen (DE); Einar Lueck, Boeblingen (DE); Stefan Raspl, Boeblingen (DE); Thomas Spatzier, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 573 days.

(21) Appl. No.: 13/292,324

(22) Filed: Nov. 9, 2011

(65) Prior Publication Data
US 2012/0137291 A1    May 31, 2012

(30) Foreign Application Priority Data
Nov. 29, 2010 (EP) .................................. 10192937

(51) Int. Cl.
G06F 9/455 (2006.01)
G06F 9/46 (2006.01)
G06F 21/00 (2013.01)

(52) U.S. Cl.
CPC .... *G06F 9/45558* (2013.01); *G06F 2009/4557* (2013.01)

(58) Field of Classification Search
CPC ............ G06F 9/45533; G06F 9/45537; G06F 9/45558
USPC ........................................... 718/1, 104; 711/6
See application file for complete search history.

(56) References Cited

U.S. PATENT DOCUMENTS

| | | | |
|---|---|---|---|
| 4,742,450 A | 5/1988 | Duvall et al. | |
| 4,758,951 A | 7/1988 | Sznyter, III | |
| 4,991,082 A | 2/1991 | Yoshizawa et al. | |
| 5,095,420 A | 3/1992 | Eilert et al. | |

(Continued)

OTHER PUBLICATIONS

Waldspurger, Carl A., "Memory Resource Management in VMware ESX Server," ACM SIGOPS Operating Systems Review—OSDI '02: Proceedings of the 5th Symposium on Operating Systems Design and Implementation Homepage archive, vol. 36, Issue SI, Winter 2002, p. 181-194 (14 pages).

(Continued)

*Primary Examiner* — Emerson Puente
*Assistant Examiner* — Willy W Huaracha
(74) *Attorney, Agent, or Firm* — Steven Chiu, Esq.; Kevin P. Radigan, Esq.; Heslin Rothenberg Farley & Mesiti P.C.

(57) ABSTRACT

A method is provided for placing a virtual machine on a target virtual machine manager out of multiple virtual machine managers. System management software is connected to the virtual machine managers and selects the target virtual machine manager for placing the virtual machine. The method includes: the system management software creating a memory profile for all virtual machines hosted on the multiple virtual machine managers, the system management software evaluating probabilities for samepage mapping of the virtual machine to be placed on the multiple virtual machine managers based on the memory profiles of the virtual machines, the system management software selecting under consideration of the probabilities for samepage mapping a most appropriate virtual machine manager as the target virtual machine manager, and the system management software placing the virtual machine on the target virtual machine manager.

11 Claims, 4 Drawing Sheets

(56) References Cited

U.S. PATENT DOCUMENTS

| | | | |
|---|---|---|---|
| 5,129,070 | A | 7/1992 | Dorotte |
| 5,319,758 | A | 6/1994 | Arai et al. |
| 5,826,057 | A | 10/1998 | Okamoto et al. |
| 6,075,938 | A | 6/2000 | Bugnion et al. |
| 6,134,601 | A | 10/2000 | Spilo et al. |
| 6,549,996 | B1 | 4/2003 | Manry, IV et al. |
| 6,785,886 | B1 | 8/2004 | Lim et al. |
| 6,789,156 | B1 | 9/2004 | Waldspurger |
| 7,356,665 | B2 | 4/2008 | Rawson, III |
| 7,472,252 | B2 | 12/2008 | Ben-Zvi |
| 7,500,048 | B1 | 3/2009 | Venkitachalam et al. |
| 7,620,766 | B1* | 11/2009 | Waldspurger ............ 711/6 |
| 7,680,919 | B2 | 3/2010 | Nelson |
| 7,702,843 | B1 | 4/2010 | Chen et al. |
| 7,716,667 | B2 | 5/2010 | van Rietschote et al. |
| 7,734,893 | B2 | 6/2010 | Hattori et al. |
| 7,984,304 | B1 | 7/2011 | Waldspurger et al. |
| 8,074,047 | B2 | 12/2011 | Abali et al. |
| 8,190,827 | B2 | 5/2012 | Eidus et al. |
| 8,234,655 | B2 | 7/2012 | Corry et al. |
| 8,244,957 | B2* | 8/2012 | Eidus et al. ............ 711/6 |
| 8,261,267 | B2 | 9/2012 | Iwamatsu et al. |
| 8,392,914 | B2 | 3/2013 | Kang |
| 8,458,434 | B2 | 6/2013 | Pfeffer et al. |
| 8,463,980 | B2 | 6/2013 | Post et al. |
| 8,499,114 | B1* | 7/2013 | Vincent ............ 711/6 |
| 8,533,711 | B2* | 9/2013 | Heim ............ 718/1 |
| 8,572,623 | B2* | 10/2013 | Bhogal et al. ............ 718/104 |
| 8,613,080 | B2* | 12/2013 | Wysopal et al. ............ 726/19 |
| 8,706,947 | B1 | 4/2014 | Vincent |
| 8,909,845 | B1 | 12/2014 | Sobel et al. |
| 8,939,572 | B2 | 1/2015 | Vincent |
| 2003/0070057 | A1 | 4/2003 | Kakeda et al. |
| 2003/0177332 | A1 | 9/2003 | Shiota |
| 2004/0024953 | A1 | 2/2004 | Babaian et al. |
| 2004/0143720 | A1 | 7/2004 | Mansell et al. |
| 2007/0006178 | A1 | 1/2007 | Tan |
| 2007/0283348 | A1 | 12/2007 | White |
| 2008/0147956 | A1 | 6/2008 | Rawson |
| 2008/0263258 | A1 | 10/2008 | Allwell et al. |
| 2009/0089781 | A1 | 4/2009 | Shingai et al. |
| 2009/0204718 | A1* | 8/2009 | Lawton et al. ............ 709/230 |
| 2009/0282481 | A1 | 11/2009 | Dow et al. |
| 2010/0030998 | A1 | 2/2010 | Kiriansky |
| 2010/0057881 | A1 | 3/2010 | Corry et al. |
| 2010/0082922 | A1 | 4/2010 | George et al. |
| 2010/0161908 | A1 | 6/2010 | Nation et al. |
| 2011/0131568 | A1* | 6/2011 | Heim ............ 718/1 |
| 2011/0214122 | A1* | 9/2011 | Lublin et al. ............ 718/1 |
| 2011/0214123 | A1* | 9/2011 | Lublin et al. ............ 718/1 |
| 2012/0131259 | A1 | 5/2012 | Baskakov et al. |
| 2012/0137045 | A1* | 5/2012 | Bacher et al. ............ 711/6 |
| 2012/0254860 | A1* | 10/2012 | Bozek et al. ............ 718/1 |

OTHER PUBLICATIONS

Office Action for U.S. Appl. No. 13/292,187 dated Apr. 29, 2013, pp. 1-34.
Arcangeli et al., "Increasing Memory Density by Using KSM," Proceedings of the Linux Symposium, Jul. 2009, pp. 19-28.
Pfoh et al., "A Formal Model for Virtual Machine Introspection," MCSec '09, Nov. 2009, pp. 1-9.
"Secure Virtualization in Cloud Computing," Jul. 2010, pp. 1-2.
Milos et al., "Satori: Enlightened Page Sharing," University of Cambridge Computer Laboratory, Cambridge, United Kingdom, Apr. 2009, pp. 1-23.
Scarfone et al., "Guide to Security for Full Virtualization Technologies," Jul. 2010, pp. 1-18.
"Effective Enterprise Java Virtualization with Oracle WebLogic Suite," An Oracle White Paper, Apr. 2010, pp. 1-13.
Hyser et al., "Automatic Virtual Machine Placement in the Data Center", HP Laboratories, Dec. 2007, pp. 1-10.
Clark et al., "Live Migration of Virtual Machines", NSDI '05: 2nd Symposium on Networked Systems and Design & Implementation, Jun. 2005, pp. 273-286.
Bacher et al., "Efficiently Determining Identical Pieces of Memory Used by Virtual Machines", U.S. Appl. No. 13/292,187, filed Nov. 9, 2011.
Bacher et al., Office Action for U.S. Appl. No. 13/292,187, filed Nov. 9, 2011 (U.S. Patent Publication No. 2013/0137045 A1), dated Sep. 30, 2013.
Milos et al., "SATORI: Enlightened Page Sharing", USENIX ATC '09, 2009 (14 pages).
Bacher et al., Office Action for U.S. Appl. No. 13/292,187, filed Nov. 9, 2011 (U.S. Patent Publication No. 2013/0137045 A1), dated Jun. 20, 2014 (45 pages).
Definition: "Heuristics", Jun. 2007, retrieved from http://searchsoftwarequality.techtarget.com/definition/heuristics on Jun. 4, 2014 (1 page).
Definition: "Operating System", Free Online Dictionary of Computing, Jun. 9, 1999, retrieved from http://foldoc.org/operating+system on Jun. 4, 2014 (1 page).
Bacher et al., Office Action for U.S. Appl. No. 13/292,187, filed Nov. 9, 2011 (U.S. Patent Publication No. 2012/0137045 A1), dated Nov. 17, 2014 (50 pages).
Bacher et al., Notice of Allowance for U.S. Appl. No. 13/292,187, filed Nov. 9, 2011 (U.S. Patent Publication No. 2012/0137045 A1), dated Feb. 4, 2015 (13 pages).

* cited by examiner

PLACING A VIRTUAL MACHINE ON A TARGET HYPERVISOR

PRIOR FOREIGN APPLICATION

This application claims priority from European patent application number 10192937.0, filed Nov. 29, 2010, which is hereby incorporated herein by reference in its entirety.

BACKGROUND

The present invention relates to a method for placing a virtual machine on a target virtual machine manager out of multiple virtual machine managers, whereby a system management software is connected to the virtual machine managers and selects the target virtual machine manager for placing the virtual machine. The present invention relates further to a method for migrating a virtual machine from a source virtual machine manager to a target virtual machine manager out of multiple virtual machine managers, whereby a system management software is connected to the virtual machine managers and the system management software removing the virtual machine from the source virtual machine manager and placing it on the target virtual machine manager according to the above method. The present invention further relates to a computer readable medium containing a set of instruction that causes a computer to perform one of the above methods and a computer program product comprising a computer usable medium including a computer usable program code, wherein the computer usable program code is adapted to execute one of the above methods.

Virtualization is becoming more and more important in IT architectures and allows the use of central servers for performing different tasks as required by a user. A system for virtualization comprises a computer hardware as known in the art which has a virtual machine manager, also called hypervisor, running thereon. The virtual machine manager can be running directly on the hardware of the computer, which means without an underlying operating system, or as an application with a standard operating system like a Linux, Windows or others. Also virtual machine managers running on an intermediate abstraction layer are known in the art. The virtual machine manager provides an environment for running virtual machines, which are also called guests. These guests are virtual instances of operating systems, which are encapsulated inside the virtual machine manager and can be executed like running directly on a computer hardware.

Depending on the requirements of the users, multiple virtual machine managers can be provided centrally to offer resources for running virtual machines. The virtual machine managers are connected to a system management software, that manages the virtual machine managers, e.g. in respect of the placement of virtual machines. For increased efficiency, the availability of resources like CPU, memory, network load or others are considered in the art for selecting a target virtual manager when a virtual machine has to placed.

Placing of a virtual machine is also important, when migration of a virtual machine from one virtual machine manager to another is required, e.g. to allow maintenance on a virtual machine manager. In this case, the virtual machine on a source virtual machine manager has to be placed on another virtual machine manager connected to the system management software. Migration of a virtual machine can also be important to increase efficiency of the sum of all virtual machine managers connected to the system management software under consideration of available resources.

Frequently, the availability of a computer memory, e.g. a RAM, is one of the most important considerations for the efficiency of the entire system, because a RAM is cost-intensive and thereby limits the number of virtual machines which can be run on a single virtual machine manager.

BRIEF SUMMARY

Provided herein, in one aspect, is a method for placing a virtual machine on a target virtual machine manager out of multiple virtual machine managers. A system management software is connected to the virtual machine managers and selects the target virtual machine manager for placing the virtual machine. The method includes: the system management software creating a memory profile for all virtual machines hosted on the multiple virtual machine managers; the system management software evaluating probabilities for samepage mapping of the virtual machine to be placed on the multiple virtual machine managers based on the memory profiles of the virtual machines; the system management software selecting under consideration of the probabilities for samepage mapping a most appropriate virtual machine manager as the target virtual machine manager; and the system management software placing the virtual machine on the target virtual machine manager.

In another aspect, a computer program product is provided for placing a virtual machine on a target virtual machine manager out of multiple virtual machine managers. A system management software is connected to the virtual machine managers and selects the target virtual machine manager for placing the virtual machine. The computer program product includes a computer-readable storage medium readable by a processor and storing executable instructions for execution by the processor for performing a method. The method includes: the system management software creating a memory profile for all virtual machines hosted on the virtual machine managers; the system management software evaluating the probabilities for samepage mapping of the virtual machine to be placed on the multiple virtual machine managers based on the memory profiles of the virtual machines; the system management software selecting under consideration of the probabilities for samepage mapping a most appropriate virtual machine manager as the target virtual machine manager; and the system management software placing the virtual machine on the target virtual machine manager.

BRIEF DESCRIPTION OF THE SEVERAL VIEWS OF THE DRAWINGS

Various embodiments of the invention are illustrated in the accompanied figures. These embodiments are merely exemplary, i.e. they are not intended to limit the content and scope of the appended claims.

DETAILED DESCRIPTION

Figure 1:
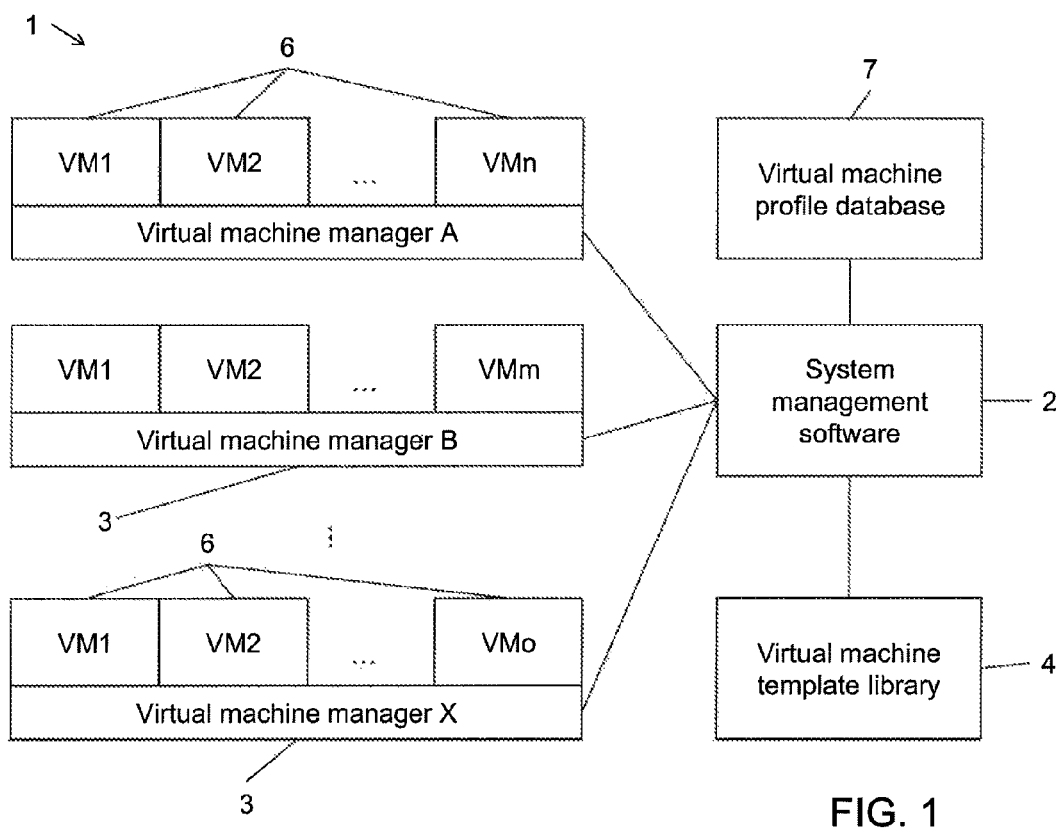
FIG. 1 shows a schematic diagram of an IT architecture comprising a system management software, in accordance with one or more aspects of the present invention.

It is therefore an object of the present invention to provide a method, a computer program product and a computer readable medium containing a set of instruction for increasing the efficiency of such a system of multiple virtual machine managers.

This object is achieved by the independent claims. Advantageous embodiments are detailed in the dependent claims.

Accordingly, this object is achieved by a method for placing a virtual machine on a target virtual machine manager out of multiple virtual machine managers, whereby a system management software is connected to the virtual machine managers and selects the target virtual machine manager for placing the virtual machine, comprising the steps of the system management software creating a memory profile for all virtual machines hosted on the multiple virtual machine managers, the system management software evaluating probabilities for samepage mapping of the virtual machine to be placed on the multiple virtual machine managers based on the memory profiles of the virtual machines, the system management software selecting under consideration of the probabilities for samepage mapping a most appropriate virtual machine manager as the target virtual machine manager, and the system management software placing the virtual machine on the target virtual machine manager.

The basic idea of the invention is to evaluate the possibilities for samepage mapping within the different virtual machine managers and to place the virtual machine on the virtual machine manager, which has the highest potential for re-utilization of memory due to samepage mapping. Samepage mapping is a technology for re-utilization of memory pages within a virtual machine manager. It is based on the assumption that different virtual machines will have memory pages, which are identical, so that the virtual machine manager can replace the memory pages of one of the virtual machines by reference to the identical memory pages of another virtual machine. The probability for samepage mapping can be increased by the placement of appropriate virtual machines together on the same virtual machine manager. The use of the same operating system and identical applications can increase the probability for samepage mapping, whereas the probability of discovering samepages within virtual machines having completely different operating systems is rather low. Accordingly, the degree of memory re-utilization can be increased to increase the efficiency of the connected virtual machine managers, since a higher number of virtual machines can be run on the one virtual machine manager. Techniques for samepage mapping are known in the art.

According to a modified embodiment of the present invention the system management software creating a memory profile for all virtual machines hosted on the multiple virtual machine managers comprises making a static analysis of an image of a virtual machine. A virtual machine running on a virtual machine manager is usually started from an existing virtual machine template, which contains an image of the virtual machine together with configuration information. These images can be inspected without the virtual machine running on a virtual machine manager so that the memory profile can be created basically at any time. Accordingly, the memory profile can be created depending on availability of resources for performing the analysis. Although the virtual machine is not running, the image allows to evaluate the memory profile for the then running virtual machine.

In a modified embodiment of the present invention, the system management software creating a memory profile for all virtual machines hosted on the multiple virtual machine managers comprises making a dynamic analysis of the virtual machine at runtime. The dynamic analysis allows the evaluation of the current memory usage and can be performed by using means known in the art. For example, the virtual machine can be accessed via ssh-scripts, which are executed inside the virtual machine. Another option is to evaluate information which is obtained directly from the virtual machine manager hosting the virtual machine. Also a kind of a snapshot of the virtual machine is possible to make the analysis of the memory profile at runtime.

According to one embodiment of the invention, the system management software creating a memory profile for all virtual machines hosted on the multiple virtual machine managers comprises evaluating an operating system type of each virtual machine. The operating system type allows a direct deduction of the chances for a samepage mapping between different virtual machines, since the memory profile of all components running thereon depends highly on the operating system type. Accordingly, the use of completely different operating systems between two virtual machines can be considered for discarding the possibilities for samepage mapping between these virtual machines, whereas use of operating systems with only minor differences on two virtual machines can be an indication for a reduction of the probabilities for samepage mapping between these virtual machines. Identical operating systems are the best basis for efficient samepage mapping.

According to a modified embodiment of the invention, the system management software creating a memory profile for all virtual machines hosted on the multiple virtual machine managers comprises creating a list of applications of each virtual machine. The use of identical or similar applications is an indication for high probabilities for samepage mapping. The list of applications can be separated into applications which are potentially used or not, e.g. applications which are only installed in the virtual machine, and applications which are executed and accordingly participate in the memory occupation of the virtual machine.

To allow identification of identical applications, in a modified embodiment of the present inventions creating a list of applications of each virtual machine comprises calculating a hash value over a binary file of each application. The hash value is a unique identifier, which can independently from other information, e.g. a name assigned to the application, be used for identification purposes.

According to a modified embodiment of the invention, the system management software creating a memory profile for all virtual machines hosted on the multiple virtual machine managers comprises evaluating history information and/or logfiles of the memory usage of the virtual machine. This allows considering not only applications, which are currently running on a virtual machine, but also applications which have been used earlier and therefore will probably be used in the future again. Also the static memory profile can be provided under consideration of the former memory usage of the virtual machine and is not limited to a prediction of memory usage due to installed operating system and/or applications.

According to another embodiment of the present invention, the system management software creating a memory profile for all virtual machines hosted on the multiple virtual machine managers comprises evaluating start-up behavior of each virtual machine. The startup behavior allows to create a list of applications which will use memory of the virtual machine when it is started. Also configuration information from the startup can be evaluated to predict a future memory usage, although the application itself is not started right at the startup.

In a further embodiment of the present invention, the system software creating a memory profile for all virtual machines hosted on the multiple virtual machine managers comprises recording the memory usage at certain points of time. The evaluation of the memory usage at certain points of time can be used to predict the memory usage in the future. For example, possible peaks of memory usage, which only occur in few occasions, can be considered for the memory profile as well as variations in memory usage over data.

In an even further embodiment of the present invention the system management software creating a memory profile for all virtual machines hosted on the multiple virtual machine managers comprises recording the memory usage over a certain time period. This allows the consideration of periodical memory usage, so that an increased memory usage of different virtual machine managers, which is not occurring at the same time, can be considered for placing these virtual machines on the same virtual machine manager, so that samepage mapping can be performed when the application is running in both virtual machines.

In a modified embodiment of the invention, the system management software creating a memory profile for all virtual machines hosted on the multiple virtual machine managers comprises evaluating meta-information regarding the operating system and/or each application. Such a matter-information can consist in a typical memory usage of different applications or the variations in memory usage between different versions of applications or operating systems.

According to a further embodiment of the invention, the system management software creating a memory profile for all virtual machines hosted on the multiple virtual machine managers comprises the system management software requesting each virtual machine manager to analyze the memory profile of all virtual machines hosted thereon and receiving the memory profiles from the virtual machine managers. Each virtual machine manager has direct access to its virtual machines and can provide the memory profiles of its virtual machines. By just providing the memory profile to the system management software, network traffic between the respective virtual machine manager the system management software can be reduced compared to e.g. passing a snapshot to the system management software. Analyzing the memory profile of virtual machines comprises the dynamic analysis of virtual machines running on virtual machine managers as well as the static memory analysis of virtual machine templates, which are available on virtual machine managers.

The object of the present invention is also achieved by a method for migrating a virtual machine to a target virtual machine manager out of multiple virtual machine managers, whereby a system management software is connected to the virtual machine managers and the system management software removing the virtual machine from the source virtual machine manager and placing it on the target virtual machine manager according to the above method for placing a virtual machine on a target virtual machine. Accordingly, the migration of the virtual machine can be realized taking advantage of the possibilities of samepage mapping as described above, so that the performance of the entire system containing multiple virtual machine managers is improved in respect of memory usage. Accordingly, a virtual machine manager can be easily disabled for maintenance purposes or in case of failure.

The object of the invention is also achieved by a computer-readable medium such as a storage device, a floppy disk, CD, DVD, Blue Ray disk, or a random access memory (RAM), containing a set of instruction that causes a computer to perform a method as specified above. The object is further achieved by a computer program product comprising a computer usable medium including computer usable program code, wherein the computer usable program code is adapted to execute the method as described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an IT-architecture 1 is shown comprising a system management software 2 and a number of virtual machine managers 3, which are denoted by the letters A to X. The system management software 2 is connected to a virtual machine template library 4, which contains virtual machine templates comprising an image 5 and configuration settings. The virtual machine templates are accessed by the system management software 2 in order to retrieve a virtual machine 6 for placing it on a virtual machine manager 3. Furthermore, the system management software 2 is connected to a virtual machine profile database 7, which is used for storing memory profiles regarding virtual machines 6. The system management software 2, the virtual machine managers 3, the virtual machine template library 4 and the virtual machine profile database 7 can be provided on the same hardware platform or at least partially on individual hardware platforms. Furthermore, it is also possible to use multiple hardware platforms for each of these elements, e.g. for performance reasons. The different hardware platforms are connected via a network connection.

Figure 5:
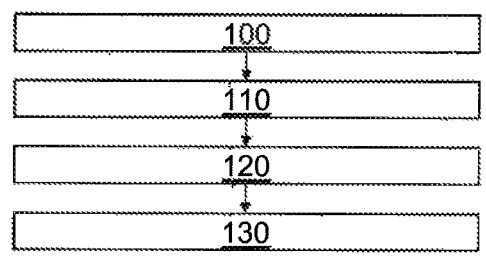
FIG. 5 shows a flowchart of a method for placing a virtual machine on a target virtual machine manager, in accordance with one or more aspects of the present invention.

When a new virtual machine 6 is to be placed on one of the virtual machine managers 3, the method as shown in FIG. 5 is applied. The method comprised in step 100 the creation of a memory profile for all virtual machines 6 hosted on the virtual machine managers 3. The memory profiles can be created when required or being stored in the virtual machine profile database 7 in advance. Anyway, the memory profile of each virtual machine 6 is created in the following way.

Figure 2:
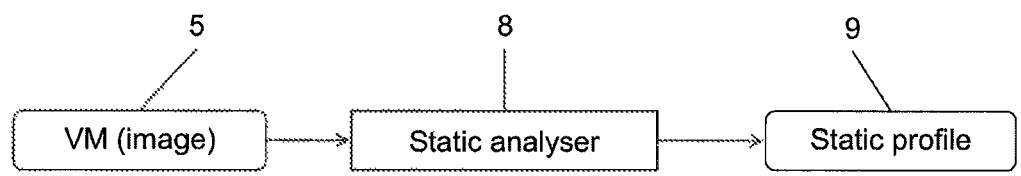
FIG. 2 shows a schematic diagram of the creation of a static memory profile of a virtual machine, in accordance with one or more aspects of the present invention.

A first alternative for creating the memory profile is from the image 5 of the virtual machine 6, which is shown in FIG. 2. The image 5 is accessed by a static analyzer 8 to create a static memory profile 9. In this embodiment the image 5 is a raw image but can also be provided in other image formats like qcow. The image 5 is first mounted by the static analyzer 8. This can be done using an appropriate command, e.g. using a 'kpartx'-command. Then the operating system of the virtual machine 6 is analyzed by the static analyzer 8. This provides not only information about the usage of the memory of the virtual machine 5, but also provides information on how further analysis of the image 7 can be performed in the static analyzer 8.

Furthermore, the static analyzer 8 evaluates the names and version information of all applications installed on the mounted image, e.g. by changerooting into the filesystem and parsing or querying a package management database (rpm or deb). Historic information like a shell history or application logs are analyzed for more detailed information on the most probable use of the applications within the virtual machine 6. The names and versions of all installed applications are stored together with a hash value, which is generated based on a binary file of each application. Furthermore, a potential memory consumption $m_{app}$ of each application is evaluated by summing the size of executable files and the libraries used by the respective application. For a Linux operating system this can be determined by the 'ldd-r'-command. The memory consumption $m_{app}$ is then added to the static memory profile 9. Furthermore, the static analyzer 8 evaluates which services, daemons and applications are started automatically, e.g. at system startup. In a Linux operating system, this information can be obtained from the sysconfig and the inittab. For all automatically started applications, a corresponding flag $f_{running}$ is set in the static profile 9. Furthermore, meta-information can be provided and analyzed to obtain further information regarding the memory usage of the operating system itself and the different applications.

The static analysis of the image 5 can be performed, when the image 5 is provided with the virtual machine template to the virtual machine library 4, or when the virtual machine template has been used for a first time to provide a virtual machine 6 on one virtual machine manager 3. Since a memory profile is only required for virtual machines 6, which are currently running on at least one virtual machine manager 3, it is only important to have the memory profile of these virtual machines 6 available in the virtual machine profile database 7. After a virtual machine 6 has been stopped and removed from a virtual machine manager 3, it is possible to remove the respective memory profile from the virtual machine profile database 7 or to keep it for possible future use.

Figure 3:
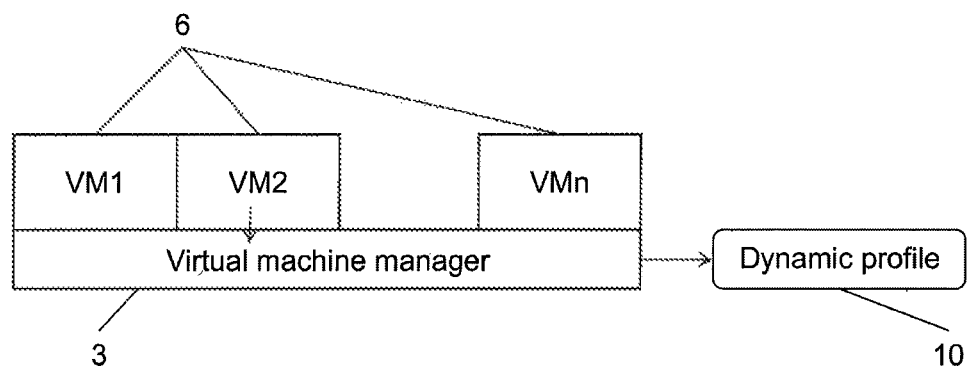
FIG. 3 shows a schematic diagram for creation of dynamic memory profile of a virtual machine, in accordance with one or more aspects of the present invention.
Figure 4:
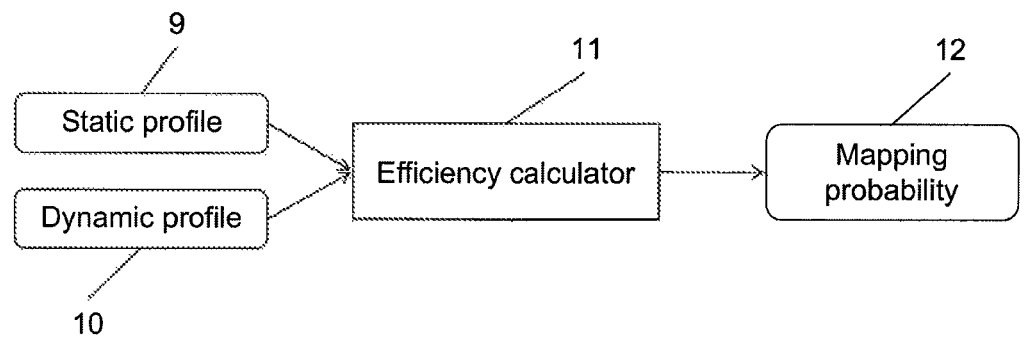
FIG. 4 shows a schematic diagram of evaluation of a samepage mapping probability or two virtual machines, in accordance with one or more aspects of the present invention.

For virtual machines 6, which are currently being executed on the virtual machine manager 3, also a dynamic analysis can be performed at runtime, as shown in FIG. 3. The kind of analysis performed as dynamic analysis is similar to the static analysis, only the means for obtaining the information regarding the memory profile are different. The dynamic analysis is performed by the virtual machine manager 3 hosting the virtual machine 6 to be analyzed upon request from the system management software 2. This request can be started at any time and also be started repeatedly to evaluate the behavior of the virtual machine 6 at certain points of time. This allows the generation of the dynamic memory profile 10 over a certain time period and a prediction of future memory consumption of the virtual machine 6. Furthermore, by performing a repeated dynamic analysis of the memory usage, certain time periods can be covered to evaluate a repeated behavior of the virtual machine 6. In case some applications are executed periodically, this can be detected and added as time information to a dynamic memory profile 10. One possibility to perform a dynamic analysis at a certain point of time is to gain access through a ssh-script. After logging in this way, the dynamic analysis is performed as already described before in respect to the static analyzer 8. An alternative way for getting access to the information for the dynamic analysis is to perform introspection into the virtual machine 6 by the virtual machine manager 3, so that the applications running within the virtual machine 6 as well as the memory usage of these applications can be directly accessed without the need to enter into the virtual machine 6. The dynamic memory profile 10 and the static memory profile 9 can be combined to form a single memory profile of a virtual machine 6. Nevertheless, in an alternative embodiment it is also possible to keep the respective memory profiles 9, 10 separate and to combine them only for evaluation of the target virtual machine manager 3.

In step 110, the system management software 2 evaluates the probabilities for samepage mapping of the virtual machine 6 to be placed on one of the multiple virtual machine managers 3 based on the memory profiles 9, 10 of the virtual machines 6. The calculations are performed by an efficiency calculator 11, which evaluates the static profile 9 and the dynamic profile 10 of the compared virtual machines as available. For example, a virtual machine 6 is started for a first time, only its static profile 9 can be taken into account for evaluation of samepage mapping capabilities. For each application of the memory profiles 9, 10 of the first virtual machine 6, a matching application is searched in the memory profile 9, 10 of the second virtual machine 6 based on the application name, the version information and the calculated hash value. Depending on meta-information available for the applications, a comparison of version information and hash value can be skipped if the meta-information indicates that only minor changes exist between the different versions.

If a match is found, an expected efficiency gain is calculated by the efficiency calculator 11 as described in detail below. The calculator uses two gains, which are a potential gain $g_p$ and an expected efficiency $g_e$ based on each matching application. The calculation of the efficiency is different depending on what kind of memory profiles 9, 10 are used for the calculation.

In case both virtual machines 6 have provided a static memory profile 9, the potential gain $g_p$ is the memory consumption of the application $m_{app}$. If the running flag $f_{running}$ in both static memory profiles 9 is set, the applications are considered to be active at the same time, so that the expected efficiency $g_e$ is equivalent to the potential gain $g_p$. Otherwise, the expected efficiency $g_e$ is equal to zero.

If a dynamic memory profile 10 is evaluated for both virtual machines 6, the potential gain $g_p$ is the current memory consumption $m_{act}$, which varies over the time depending on the activity of the application. If the flag $f_{running}$ is set for both dynamic profiles 10, the expected efficiency $g_e$ is calculating by the memory consumption $m_{act}$ multiplied by the ratio of the time $i_{active}$ the application is simultaneously active in both virtual machines 5 over the total number of intervals $i_{period}$ which has been evaluated. Otherwise, the expected efficiency $g_e$ is equal to zero.

In the case of one virtual machine 6 having a dynamic memory profile 10 and the other virtual machine 5 having a static memory profile 9, the calculation is performed as following. The potential gain $g_p$ is equal to the memory consumption $m_{app}$ of the application. If the running flag $f_{running}$ is set for the application in the memory profiles 9, 10 of both virtual machines 6, the expected efficiency $g_e$ is calculated by multiplying the memory consumption $m_{app}$ of the application by the number of intervals $i_{active}$ in which the application in the dynamically measured virtual machine 6 has been running and dividing it through the total number of intervals $i_{period}$ which has been evaluated for creating the dynamic memory profile 10. Otherwise, the expected efficiency $g_e$ is equal to zero.

These calculations are performed for all applications of the compared virtual machines 5 and summed up to calculate an overall expected memory efficiency/overlap as a mapping probability 12.

In step 120 the system management software 2 selects under consideration of the mapping probability 12 for all virtual machines 6 running on each virtual machine manager 3 the probability for samepage mapping of the virtual machine 6 on each virtual machine manager 3. The virtual machine manager 3 with the highest mapping probability 12 is selected as the target virtual machine manager 3 for placing the virtual machine 6.

Finally, in step 140, the system management software 2 places the virtual machine 6 on the target virtual machine manager 3. The virtual machine 6 can be started from the virtual machine template library 4 or can be provided by any means to the system management software 2.

The above described method also enables the migration of a virtual machine 6 from a source virtual machine manager 3 to a target virtual machine manager 3. In this case, the source virtual machine manager 3 is excluded from the evaluation of the virtual machine manager 3 offering the highest probability for samepage mapping for the virtual machine 6 to be migrated. Migration can be performed to increase the efficiency of the entire IT-architecture 1 or in case of maintenance or failure of a certain virtual machine manager 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for placing a virtual machine on a target virtual machine manager out of multiple virtual machine managers, wherein a system management software is connected to the virtual machine managers and selects the target virtual machine manager for placing the virtual machine, the method comprising:

the system management software creating a memory profile for all virtual machines hosted on the multiple virtual machine managers, each memory profile being based on at least one of a static analysis of an image of the virtual machine, a dynamic analysis of the virtual machine at runtime, or an evaluation of start-up behavior of the virtual machine, evaluating probabilities for samepage mapping of the virtual machine to be placed in comparison to all virtual machines hosted on the multiple virtual machine managers based, at least in part, on the created memory profiles of the virtual machines, the evaluating including:

for an application of the memory profile of the virtual machine to be placed, searching the memory profile of another virtual machine for a matching application;

for the matching found, calculating an expected efficiency gain for the virtual machine to be placed based, at least in part, on a memory consumption of the matching application;

summing expected efficiency gain calculations for applications of the virtual machine to be laced to calculate the probability for samepage mapping of the virtual machine to be placed;

the system management software selecting under consideration of the probabilities for samepage mapping a most appropriate virtual machine manager as the target virtual machine manager; and the system management software placing the virtual machine on the target virtual machine manager.

2. The method of claim 1, wherein the system management software creating a memory profile for all virtual machines hosted on the multiple virtual machine managers further comprises evaluating an operating system type of each virtual machine.

3. The method of claim 1, wherein the system management software creating a memory profile for all virtual machines hosted on the multiple virtual machine managers further comprises creating a list of applications of each virtual machine.

4. The method of claim 3, wherein creating a list of applications of each virtual machine comprises calculating a hash value over a binary file of each application.

5. The method of claim 1, wherein the system management software creating a memory profile for all virtual machines hosted on the multiple virtual machine managers further comprises evaluating history information and/or logfiles of the memory usage of the virtual machine.

6. The method of claim 1, wherein the system management software creating a memory profile for all virtual machines hosted on the multiple virtual machine managers further comprises recording the memory usage at certain points of time.

7. The method of claim 6, wherein the system management software creating a memory profile for all virtual machines hosted on the multiple Virtual machine managers further comprises recording the memory usage over a certain time period.

8. The method of claim 1, wherein the system management software creating a memory profile for all virtual machines hosted on the multiple virtual machine managers further comprises evaluating meta-information regarding the operating system and/or each application.

9. The method of claim 1, wherein the system management software creating a memory profile for all virtual machines hosted on the multiple virtual machine managers further comprises the system management software requesting each virtual machine manager to analyze the memory profile of all virtual machines hosted thereon and receiving the memory profiles from the virtual machine managers.

10. The method of claim 1, further in combination with migrating a virtual machine from a source virtual machine manager to a target virtual machine manager out of the multiple virtual machine managers, wherein the system management software is connected to the virtual machine managers and the system management software removes the virtual machine from the source virtual machine manager and places it on the target virtual machine manager.

11. A computer program product for placing a virtual machine on a target virtual machine manager out of multiple virtual machine mangers, wherein a system management software is connected to the virtual machine managers and selects the target virtual machine manager for placing the virtual machine, the computer program product comprising:

a non-transitory computer-readable storage medium readable by a processor and storing executable instructions for execution by the processor for performing a method, the method comprising:

the system management software creating a memory profile for all virtual machines hosted on the multiple virtual machine managers, each memory profile being based on at least one of a static analysis of an image of the virtual machine, a dynamic analysis of the virtual machine at runtime, or an evaluation of start-up behavior of the virtual machine, evaluating probabilities for samepage mapping of the virtual machine in comparison to all virtual machines hosted on the multiple virtual machine managers based, at least in part, on the created memory profiles of the virtual machines, the evaluating including:

for an application of the memory profile of the virtual machine to be placed, searching the memory profile of another virtual machine for a matching application;

for the matching application found, calculating an expected efficiency gain for the virtual machine to be placed based, at least in part, on a memory consumption of the matching application;

summing expected efficiency gain calculations for applications of the virtual machine to be placed to calculate the probability for samepage mapping of the virtual machine to be placed;

the system management software selecting under consideration of the probabilities for samepage mapping a most appropriate virtual machine manager as the target virtual machine manager, and the system management software placing the virtual machine on the target virtual machine manager.

\* \* \* \* \*